United States Patent [19]
Jander

[11] Patent Number: 5,991,069
[45] Date of Patent: Nov. 23, 1999

[54] SPLIT-PUMPED DUAL STAGE OPTICAL FIBER AMPLIFIER

[75] Inventor: Ralph Brian Jander, Freehold, N.J.

[73] Assignee: Tyco Submarine Systems, Ltd., Morristown, N.J.

[21] Appl. No.: 09/010,598

[22] Filed: Jan. 22, 1998

[51] Int. Cl.[6] .............................. G02B 6/26; H01L 15/00; H01S 3/30

[52] U.S. Cl. ........................ 359/337; 359/134; 359/160; 359/341; 372/6; 372/71

[58] Field of Search ..................................... 359/134, 160, 359/341, 345, 337; 372/6, 71

[56] References Cited

U.S. PATENT DOCUMENTS

| | | | |
|---|---|---|---|
| 5,050,949 | 9/1991 | DiGiovanni et al. | 359/341 |
| 5,392,154 | 2/1995 | Chang et al. | 359/341 |
| 5,406,411 | 4/1995 | Button et al. | 359/341 |
| 5,506,723 | 4/1996 | Junginger | 359/341 |
| 5,608,571 | 3/1997 | Epworth et al. | 359/341 |
| 5,673,280 | 9/1997 | Grubb et al. | 372/6 |

FOREIGN PATENT DOCUMENTS 387075   9/1990   European Pat. Off. .

*Primary Examiner*—Nelson Moskowitz
*Attorney, Agent, or Firm*—Kenyon & Kenyon

[57] ABSTRACT

A dual-stage doped fiber amplifier is provided which utilizes a single pump laser and a passive power splitter to pump both amplifier stages. The passive splitter couples a first portion of the power output of the single pump laser to a first stage amplifier and a second portion of the pump power to the second stage. In this manner, the performance characteristics of the amplifier can be controlled by utilizing a single pump source.

20 Claims, 2 Drawing Sheets

SPLIT-PUMPED DUAL STAGE OPTICAL FIBER AMPLIFIER

BACKGROUND OF THE INVENTION

The present invention relates to a doped fiber amplifier arrangement and, specifically, to a dual-stage amplifier with a passive pump splitting arrangement which allows low noise operation and variable signal gain with a single pump laser.

Erbium doped fiber amplifiers have revolutionized lightwave systems. These amplifiers have replaced detection and regeneration systems in long transglobal systems where fiber attenuation and dispersion act to degrade the transmitted signal. Further, fiber amplifiers are utilized in wide area signal distribution systems where distribution losses become appreciable.

In practice, the fiber amplifier is placed in-line with the signal carrying fiber to allow the optical signal to enter the Erbium fiber and directly experience gain. Connectors or fusion splices may be used to attach the amplifier to the signal fiber. Input and output isolators are typically utilized in unidirectional systems to control the direction of signals and amplified spontaneous emissions from the Erbium gain medium.

Topologically, fiber amplifiers take many forms. Multiple stages may be utilized to optimize performance. Additionally, either 980 nm or 1480 nm laser sources are typically utilized to co-, counter-, or co- and counter-propagate pump power within each Erbium fiber amplifier stage. Wavelength multiplexers are utilized to couple the pump power to the Erbium fiber. Inter- and intra-stage isolators and filters maybe utilized to effect the noise and gain performance. In today's applications, a specific design consideration is flattening gain over the wavelength range of interest by selecting appropriate lengths of Erbium fiber or by utilizing an appropriate gain shaping filter.

Practical Erbium fiber amplifiers fall into one of three classifications: (1) post (or booster) amplifier, (2) in-line amplifier, or, (3) pre-amplifier. The post and pre-amplifier are often called terminal amplifiers. They are typically found at the ends (terminals) of a lightwave system, while the in-line amplifier is found mid-span in the system. Functionally, amplifier types differ in their input and output specifications.

The post amplifier operates in saturation to produce high optical output power (+17 to +24 dBm). The pre-amplifier is designed to deliver large small signal gain with minimal noise figure. Typically, a pre-amplifier will deliver >30 dB of small signal gain with output power >−10 dBm. The in-line amplifier delivers 10 to 20 dB of gain from input power levels between −20 and −10 dBm.

Erbium doped fiber amplifiers are commercially available from many suppliers. One or two stage amplifiers with one or more pumps per stage, either at 1480 nm or 980 nm are common. The bulk of commercial amplifiers have a limit range of variable gain with which to either stabilize output power or accommodate a range of input conditions.

An often used method of adjusting the gain state of a fiber amplifier is by dynamically adjusting the pump power in one or more stages. The most common way for controlling amplifier gain without sacrificing the total amplifier noise figure is by adjusting the pump power in the second stage of a dual-stage amplifier, i.e., leaving the first stage gain high enough to insure a reasonable total noise figure. This method usually allows approximately 22 dB of variable gain and requires a minimum of two pumps, one for each stage. Further, the second stage gain control is difficult due to the rapid nonlinear change of gain with decreasing pump power.

Therefore, a need remains in the art for an optical amplifier arrangement which combines the lower noise figure advantage of a dual-stage design with an extended range of variable gain and which is readily controllable with the cost advantages of a single pump laser.

SUMMARY OF THE INVENTION

A split-pumped, dual-stage optical amplifier is provided. More particularly, the invention relates to a dual-stage, doped fiber amplifier which utilizes a single pump laser and a passive splitter to simultaneously and unequally pump both stages.

A dual-stage doped fiber amplifier is provided which utilizes a single pump laser and a passive 90:10 power splitter. The passive splitter couples 90% of the power output from the single pump laser to the first stage of an amplifier and 10% of the pump power to the second stage.

The present invention provides for the achievement of the performance characteristics of an isolated dual-stage amplifier with the cost effective use of a single pump laser. An extended range of variable gain is achievable when compared against the gain achievable with an individually pumped dual-stage amplifier. Additionally, gain variation with pump power is more gradual which allows for easier control of the amplifier gain state.

DETAILED DESCRIPTION

Figure 1:
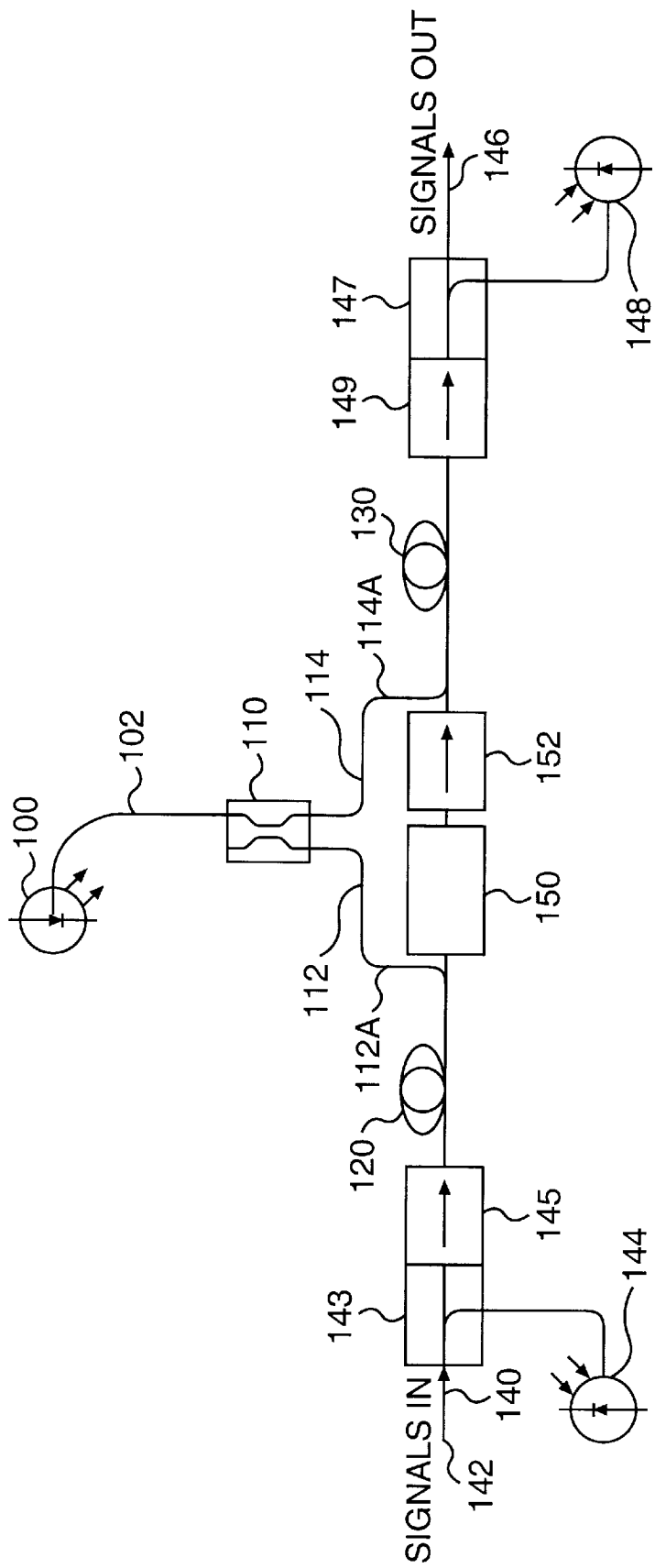
FIG. 1 illustrates one embodiment for a split pumped, dual-stage optical fiber amplifier of the present invention.

FIG. 1 illustrates one embodiment for a split pumped, dual-stage optical fiber amplifier of the present invention. As shown, the disclosed embodiment includes a single pump source 100, a passive power splitter 110, a first in-line amplifier stage 120 and a second in-line amplifier stage 130.

First in-line amplifier stage 120 and second in-line amplifier stage 130 are both erbium-doped fibers. Both amplifier stages are placed in-line with the signal carrying fiber 140 and may be attached to signal fiber 140 by utilizing either connectors or fusion splices. The length of the fiber utilized for each in-line fiber amplifier stage is dependent upon the specific characteristics of the system into which the amplifier is inserted and therefore, the two stages can either be of the same length or of different lengths.

As illustrated, the signal carried on signal carrying fiber 140 enters the fiber amplifier from end 142 of the signal fiber and exits the fiber amplifier at end 146. As such, the signal to be amplified travels from left to right along signal fiber 140. Input tap 143 is provided to tap a portion of the input signal traveling along signal fiber 140 and provide this signal to input signal level (ISL) detector 144. Similarly, output tap 147 taps a portion of the output signal from the amplifier and provides this signal to output signal level (OSL) detector 148. Additionally, optical isolators 145 and 149 are provided. Input and output isolators 145 and 149, respectively, are typically utilized in unidirectional systems to control the direction of signals and amplified spontaneous emissions from the Erbium gain medium.

The tapped input and output signals from taps 143 and 147 can be utilized to measure the performance of the fiber amplifier. However, the optical taps, detectors and isolators are optional features and are not required when practicing the present invention.

Also provided is filter 150 and isolator 152. Inter- and intra-stage isolators and filters maybe utilized to effect the noise and gain performance of the amplifier. Filter 150 can be, for example, a noise filter, a signal shaping filter or a bandpass filter, however, the decision of whether or not to include filter 150 and isolator 152 is dependent upon the requirements of the particular system into which the amplifier is inserted and thus are not required for the present invention.

Single pump source 100 is a pump laser that provides power output at a wavelength, for example, of 980 nanometers (nm). The power from pump source 100 is coupled onto output fiber 102 and is then input to passive power splitter 110. Power splitter 110 splits the power from pump source 100 into a first power level 112 and a second power level 114. The power of first power level 112 is coupled onto an output fiber 112A from splitter 110 which is then coupled to first in-line amplifier stage 120 to provide pump power to the first stage. Second power level 114 is coupled onto an output fiber 114A from splitter 110 for utilization as the pump power for second in-line amplifier stage 130. Wavelength multiplexers are utilized to couple the pump power to the Erbium fiber. As disclosed, first in-line amplifier stage 120 is counter-pumped and second in-line amplifier stage 130 is co-pumped. However, the invention is not limited to this configuration. Each amplifier stage can be co-pumped or counter-pumped, depending upon the requirements of the system into which the amplifier is inserted.

Splitter 110, as disclosed, splits the power output from pump source 100 into a first power level 112, which is 90% of the output from pump source 100, and a second power level 114, which is 10% of the output from the pump source. However, the ratio of the power split from single pump source 100 to first power level 112 and second power level 114 can be adjusted by selecting splitter 110 to provide the desired power ratios. As such, a power ratio of 95% for first power level 112 and 5% for second power level 114 and a ratio of 85% and 15%, respectively, for example, are obtainable. Selection of the power ratio for the power supplied to the first stage in-line amplifier and the second stage in-line amplifier is dependent upon the design requirements for the particular system. Because one factor affecting the performance of the amplifier is the power supplied to both the first stage and the second stage of the amplifier, adjustment of the power supplied to each stage, as provided from a single pump source, can be utilized to control the performance of the amplifier.

Figure 2:
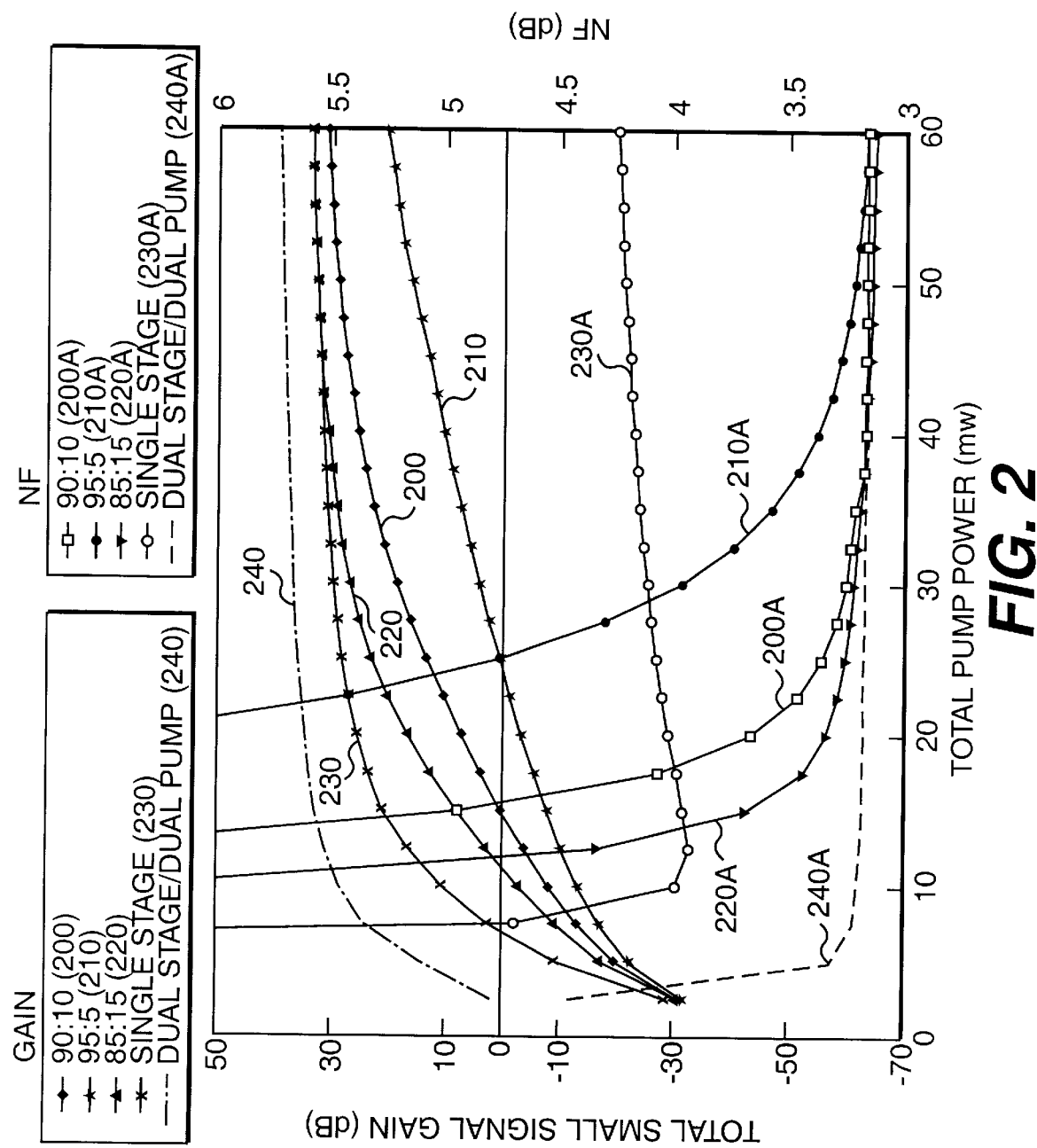
FIG. 2 provides gain and noise characteristics for the split pumped, dual-stage optical fiber amplifier of the present invention.

FIG. 2 shows the performance characteristics of the single pump, dual-stage amplifier design of the present invention. As can be seen, the gain and performance characteristics for the amplifier can be controlled by adjusting the ratio of the power supplied to each amplifier stage. This control of the amplifier by providing unequal power levels to each amplifier stage is achieved by utilizing a single pump source to pump both stages.

FIG. 2 provides graphs for the signal gain and the noise figure versus total pump power for the split pump power ratios of 90%/10%, 95%/5%, and 85%/15%, as supplied to the first in-line amplifier stage and the second in-line amplifier stage, respectively. The graphs clearly show that by controlling the power supplied to each stage of the amplifier, as supplied by a single pump source, the performance characteristics of the amplifier can be adjusted. In selecting the particular power levels that are to be supplied to each stage of the amplifier, the system designer will consider the particular requirements of the system into which the amplifier is to be installed. For example, if a particular system requires that the noise level of the amplifier be below a threshold value, which again is determined by the system's requirements, the power levels supplied to the first and second stages of the amplifier can be adjusted to result in a noise level for the amplifier that is below the threshold value.

As can be seen in FIG. 2, curves 200 and 200A show the performance characteristics for the embodiment where 90% of the pump output power from pump source 100 is provided to first in-line stage 120 and 10% of the pump power from the pump source is provided to second in-line stage 130. Curves 210 and 210A illustrate the performance characteristics of the amplifier where 95% of the pump power is provided to the first stage and 5% of the pump power is provided to the second stage. When comparing the performance of the amplifier when the power is split by the ratio of 90%/10% to the embodiment where the power is split by the ratio of 95%/5%, it is clearly seen that the 90%/10% power ratio embodiment provides greater signal gain and less noise than the 95%/5% power ratio embodiment with increasing total supplied pump power.

When comparing both of the above power splitting embodiments, namely the 90%/10% power ratio and the 95%/5% power ratio, to the embodiment where the power supplied to the first stage is 85% of total pump power and the power supplied to the second stage is 15% of pump power, it is observed that the gain for the 85%/15% ratio is greater than that for the other two embodiments and the noise figure for the 85%/15% ratio is less than that for the other ratios.

The remaining curves shown on the graph are performance characteristics for the gain and noise vs. increasing pump power for amplifier configurations of a single stage/single pump amplifier and a dual-stage/dual pump amplifier. For the single stage/single pump amplifier configuration, curve 230 shows the gain performance and curve 230A shows the noise performance. For the dual-stage/dual pump amplifier configuration, curve 240 shows the gain performance and curve 240A shows the noise performance for this amplifier.

As can be seen, when comparing the performance curves for the single stage/single pump amplifier configuration to the performance curves for the dual-stage/single pump amplifier of the present invention, the dual-stage/single pump configuration provides for more linearized gain, particularly at lower total pump power levels, comparable total gain, and much improved noise performance.

When comparing the performance curves for the dual-stage/dual pump amplifier configuration to the performance curves for the dual-stage/single pump amplifier of the present invention, the dual-stage/single pump configuration also provides for more linearized gain at lower total pump power levels, an extended range of variable gain, and comparable performance in total gain and noise.

Thus, the present invention achieves the desirable low noise performance characteristic of the dual-stage/dual pump amplifier while only requiring a single pump source, which results in cost efficiencies. Additionally, the performance of the amplifier can be controlled by adjusting the power supplied to each amplifier stage from the single pump source.

Several alternatives on the disclosed embodiments are contemplated. Pump source 100 is disclosed as a laser operating at 980 nm, however, other pump source wavelengths, e.g., 1480 nm, can be utilized. Additionally, both in-line fiber amplifier stages are disclosed as being erbium-doped fibers, however, other fiber amplifier designs can be incorporated into the present invention. The power splitting ratios disclosed for pumping the first stage and second stage of the amplifier are illustrative of the various ratios that can be implemented. Depending upon the particular requirements of the optical system, other power splitting ratios can be utilized.

The disclosed embodiments are illustrative of the various ways in which the present invention may be practiced. Other embodiments can be implemented by those skilled in the art without departing from the spirit and scope of the present invention.

What is claimed is:

1. A dual-stage fiber amplifier comprising:
    a single pump source;
    a power splitter, wherein said power splitter splits the power output of said single pump source into a first power level and a second power level lower than the first power level;
    a first in-line amplifier stage coupled to said power splitter; and
    a second in-line amplifier stage coupled to said power splitter;
    wherein said first power level is provided to said first in-line amplifier stage and said second power level is provided to said second in-line amplifier stage.

2. The dual-stage fiber amplifier of claim 1 wherein said pump source is a laser.

3. The dual-stage fiber amplifies of claim 1 wherein said first power level is 90% of the power output of said single pump source and said second power level is 10% of the power output of said single pump source.

4. The dual-stage fiber amplifier of claim 1 wherein said first power level is 95% of the power output of said single pump source and said second power level is 5% of the power output of said single pump source.

5. The dual-stage fiber amplifier of claim 1 wherein said first power level is 85% of the power output of said single pump source and said second power level is 15% of the power output of said single pump source.

6. The dual-stage fiber amplifier of claim 1 wherein the gain and noise characteristics of the dual-stage fiber amplifier can be controlled by adjusting said first power level provided to said first in-line amplifier stage and said second power level provided to said second in-line amplifier stage.

7. The dual-stage fiber amplifier of claim 1 wherein said first in-line amplifier stage and said second in-line amplifier stage are both erbium-doped fibers.

8. The dual-stage fiber amplifier of claim 7 wherein said erbium-doped fibers are of a different length.

9. The dual-stage fiber amplifier of claim 1 wherein said first in-line amplifier stage is counter-pumped and said second in-line amplifier stage is co-pumped.

10. A method for pumping a dual-stage fiber amplifier comprising the steps of:
    splitting the power output of a single pump source into a first power level and a second power level lower than the first power level;
    providing said first power level to pump a first in-line amplifier stage; and
    providing said second power level to pump a second in-line amplifier stage.

11. The method for pumping a dual-stage fiber amplifier of claim 10 wherein said first power level is 90% of the power output of said single pump source and said second power level is 10% of the power output of said single pump source.

12. The method for pumping a dual-stage fiber amplifier of claim 10 wherein said first power level is 95% of the power output of said single pump source and said second power level is 5% of the power output of said single pump source.

13. The method for pumping a dual-stage fiber amplifier of claim 10 wherein said first power level is 85% of the power output of said single pump source and said second power level is 15% of the power output of said single pump source.

14. The method for pumping a dual-stage fiber amplifier of claim 10 wherein said first in-line amplifier stage is counter-pumped and said second in-line amplifier stage is co-pumped.

15. The method for pumping a dual-stage fiber amplifier of claim 10 further comprising the step of adjusting said first and second power levels to lower a resulting noise level of the amplifier below a threshold value.

16. A method for controlling the gain and noise characteristics of a dual-stage fiber amplifier comprising the steps of:
    supplying power to pump said dual-stage amplifier by utilizing a single pump source;
    controlling the power supplied by said single pump source to pump a first in-line amplifier stage with a first power level; and
    controlling the power supplied by said single pump source to pump a second in-line amplifier stage with a second power level lower than the first power level.

17. The method for controlling the gain and noise characteristics of a dual-stage fiber amplifier of claim 16 wherein said first in-line amplifier stage is counter-pumped and said second in-line amplifier stage is co-pumped.

18. The method for controlling the gain and noise characteristics of a dual-stage fiber amplifier of claim 16 wherein said power level supplied by said single pump source to pump said first in-line amplifier stage is 90% of the power output of said single pump source and said power level supplied by said single pump source to pump said second in-line amplifier stage is 10% of the power output of said single pump source.

19. The method for controlling the gain and noise characteristics of a dual-stage fiber amplifier of claim 16 wherein said power level supplied to pump said first and said second in-line amplifier stages is controlled by splitting the power output of said single pump source.

20. The method for controlling the gain and noise characteristics of a dual-stage fiber amplifier of claim 16 wherein the steps of controlling the power levels supplied to said first and second amplifier stages comprises the step of adjusting the power levels supplied to said first and second amplifier stages to lower a resulting noise level of the amplifier below a threshold value.

\* \* \* \* \*